Inventor:
Karl Obermoser
By Ernest A. Marwick,
His Attorney.

Inventor:
Karl Obermoser (A - B)

United States Patent Office 3,447,642
Patented June 3, 1969

3,447,642
FRICTION COUPLING
Karl Obermoser, Roggemannstr. 7,
Oldenburg, Germany
Filed Dec. 22, 1966, Ser. No. 603,873
Int. Cl. F16d 51/00, 65/04
U.S. Cl. 188—78                                    7 Claims

ABSTRACT OF THE DISCLOSURE

A friction coupling, for example a friction brake, including a rocker member having two arms of mutually different length, each of which arms carries a friction element which co-operates with a drum member, the rocker member being mounted so as to be capable of rocking about a fulcrum on an operating lever which is itself capable of pivoting about a reaction point. The friction coupling operates independently of the coefficient of friction between the friction elements and the drum member, the theory underlying this being set out in the specification.

---

The invention relates to a friction coupling e.g. brake in which friction elements of small peripheral extent rest against a drum member in a statically determined way.

In friction torque generating devices, such as friction couplings or friction brakes, it has so far not been possible to define a really reliable and unambiguous relationship between the peripheral forces produced at its rubbing surfaces, on the one hand, and the contact force responsible for producing this peripheral force; the reasons for this being manifold.

In considering friction between curved surfaces, the direction of the contact force is a fixed factor, whereas individual elementary areas along the considerable peripheral extent of the friction device have varying angles of incidence in relation to this direction so that the law of the inclined plane, in accordance with which the peripheral friction-induced force is derived from the applied contact force, gives widely varying values in accordance with the particular point chosen. Added to this, there is the fact that the curvature produces couples, the effect of which depends upon the point on the periphery at which the corresponding elementary areas happen to be located. However, since it is technically out of the question so to manufacture and operate the cylindrical surfaces of the drum member and the friction arrangement which is pressed into contact with it, that all the elementary areas along the periphery are uniformly effective (this especially in view of the thermal expansion which must take place), it has to be accepted that in shoe-type arrangements of this kind there is a static uncertainty in the reaction to the contact force and in the resultant friction-induced peripheral force (which is the conglomerate product of different individual effects) and this means right from the start that the production of a clearly defined peripheral force U as the consequence of a given contact force K applied to the shoe arrangement, is out of the question on the basis of force considerations alone.

It is indeed, known to given the friction lining a pivoting facility vis-a-vis the back of the shoe, this in place of the usual rigid mode of attachment, in order to try to improve the lining contact along the periphery. However, this does nothing to remove the static uncertainty in the contact force reaction.

A first step in this direction has been made in the form of the measure, disclosed elsewhere, in accordance with which the reaction to the shoe force K is supplied in a statically determined fashion through the agency of friction elements of small peripheral extent, this artifice being used in conjunction with a technique of achieving highly exact friction conditions involving polished surfaces (German Patent 934,381).

However, even by defining conditions to these extremes where the reaction at the friction surfaces to the shoe-contact force K is concerned, the production of a peripheral friction force U which has a determined relationship with K continuous to break down because of the incalculable behaviour of the critical coefficient of friction, with its dependence upon the surface condition of the rubbing surfaces, the relative velocity between the two, temperature, fouling, oiling, etc. It is therefore the aim of the present invention to cut out the influence of the coefficient of friction in the relationship between U and K, this within the limits of practical necessity. This aim is achieved by virtue of the fact that the friction coupling, e.g. friction brake, is so designed that it operates by a mechanism of shift in force vectors, independently of the co-efficient of friction of the friction elements, and in fact adjusts itself automatically. Practical realisation of the principle of the invention for example takes a form in which, for the purpose of producing friction, a friction element is arranged on each of the arms of a rocker device, which arms are in fact not of the same length, the rocker advantageously having a knife-edge bearing as its fulcrum. This fulcrum is arranged on an operating level which pivots about a reaction point. In a further embodiment of the invention, the reaction point is so arranged for force transmission that the reaction forces produced by shift in the force vector can be used to operate auxiliary shoes.

By way of explanation, the invention will be discussed on the basis of an example in the form of an internal shoe arrangement.

Figure 1:
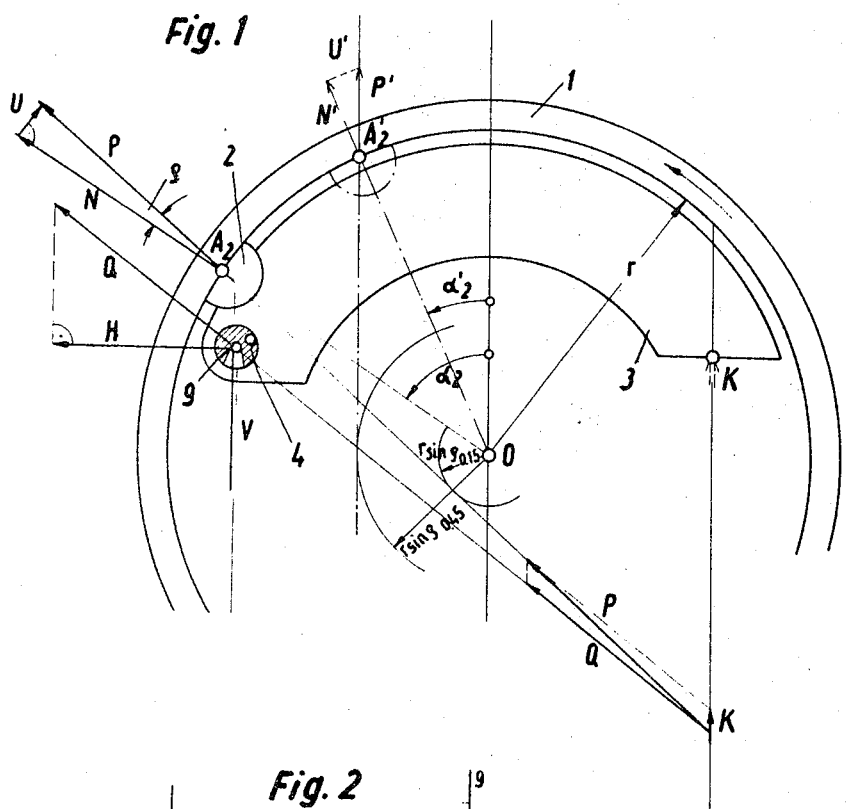
FIGURE 1 shows the force relationships involved in generating friction in an internal shoe arrangement.
Figure 3:
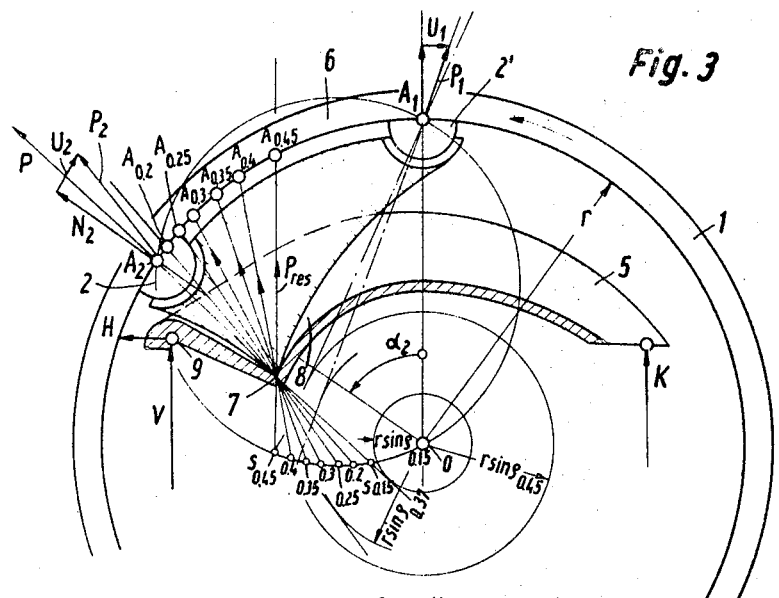
FIGURE 3 shows the force vector shift taking place in the arrangement of FIGURE 1.
Figure 4:
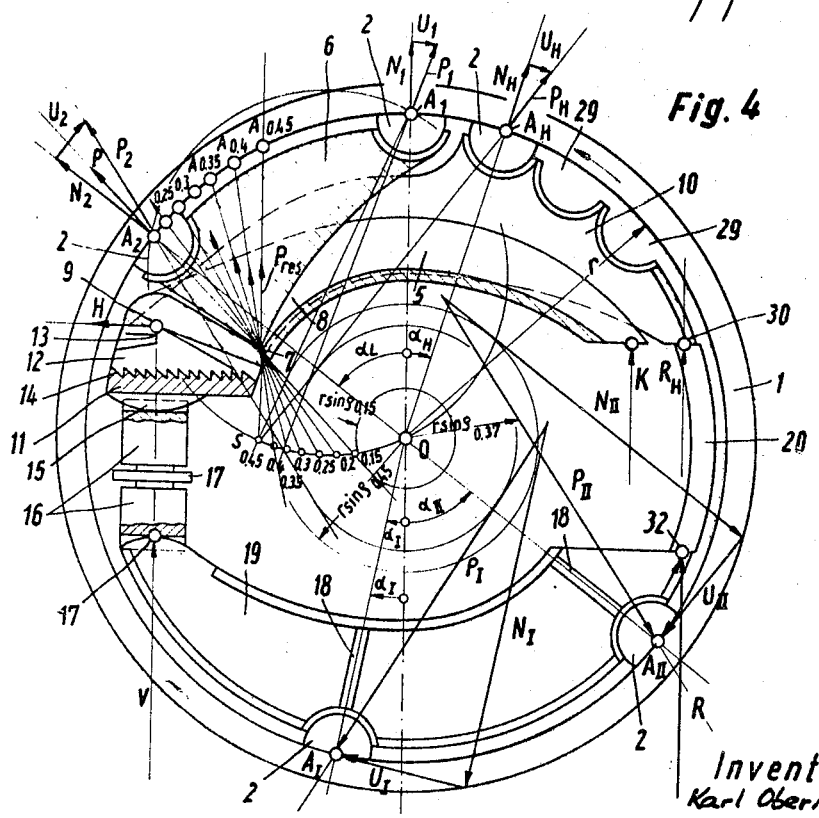
FIGURE 4 shows the reaction forces occurring at the reaction point relating to the force vector shift pattern of FIGURE 3; and indicates how these reaction forces can be employed to operate an auxiliary shoe and thereby achieve additional effects.

In the internal shoe arrangements shown in FIGURES 1, 3 and 4, we are dealing, inclusive of the associated force digrams, with semi-schematic illustrations looking along the axis of rotation 0, and the direction of the applied friction couple is in all cases taken to be the clockwise sense so that the arrow drawn in on the drum member 1 and showing rotation in the opposite direction to this indicates that we are dealing here with the case of a brake in which the internal shoe arrangement is fixed. In the case of the friction coupling, in which by contrast the friction system constituted by the internal shoe arrangement has an accelerating effect upon the drum member 1, the said arrow would point in the other direction and would indicate that the brake system was rotating, the drum member 1 lagging behind it and possibly even being stationery at first.

In the arrangement of FIGURE 1, there engages with the cylindrical internal surface of the drum member 1, of radius $r$, a narrow bar-shaped friction element 2 of approximately semi-circular profile, this nesting in a corresponding groove formed in the external periphery of the shoe member 3 and being rotatable therein. The shoe member 3 is mounted to pivot about the fixed fulcrum pin 4, i.e. about its central axis 9. In accordance with the force diagram, the contact force K applied to the right-hand end of the shoe 3 produces at the friction element 2, due to the latter's facility for rotating in its bearing groove and considered as it were at the point of reaction $A_2$ on the drum member 1, the peripheral force U which is a function of the resultant reaction force P inclined to the radial force component N at the friction angle $s$. This friction angle is dependent upon the instantaneous coefficient of friction $\mu=\tan s$ and is at all times so indicated that the line of action of the resultant P makes a tangent with a circle described about the centre of rotation 0 and having the radius $r. \sin s$. Of the two force components K and Q which go to make up the resultant P, the force Q is transferred to the centre of the fulcrum pin 4 and there resolves into the horizontal component H and the vertical component V.

Figure 2:
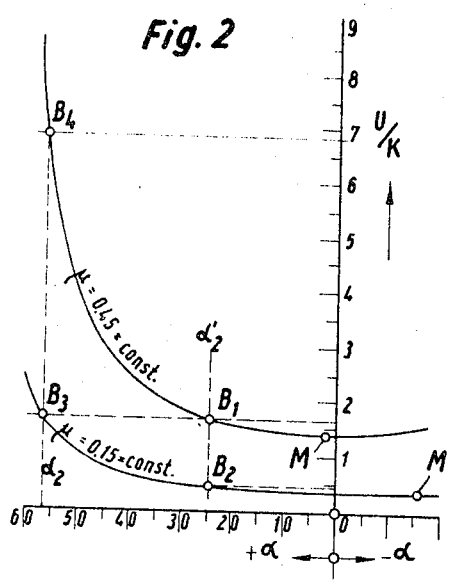
FIGURE 2 is the associated graph illustration.

The graph of FIGURE 2 indicates how the peripheral friction force U produced by the contact force K, varies if the friction element is displaced along the shoe 3, this element making at the point $A_2$ an angle of $\alpha_2$ to the perpendicular passing through the origin 0 and parallel to the contact force K. The peripheral force U has been plotted in terms of the relative value $U/K$, against the angle $\alpha$ measured to either side of the perpendicular. The upper curve corresponds to a relatively high, assumed constant, coefficient of friction $\mu$, and the lower curve to a coefficient of friction which is for example only a third of the former, and is again assumed to be constant. Characteristically, these curves have arms which, at either side of a minimum M, steadily increase in slope towards high values of $U/K$, the illustration having been more or less confined to the left-hand arms, corresponding to positive angles $\alpha$.

If, for example in the manner shown in chain-dotted fashion in FIGURE 1, the shoe member 3 uses a friction element 2 which has been displaced to the point $A_2'$, this having the relative angle $\alpha_2'$, and if, assuming the high friction coefficient of the upper curve, the system is operated at the point $B_I$ on the graph of FIGURE 2, then if for some reason or other the coefficient of friction drops to the value corresponding to the lower curve so that the same contact force K yields a much reduced peripheral force U, corresponding in fact to the condition defined by the point $B_2$, the friction-induced peripheral force U can nevertheless be returned to the original value if the angle $\alpha_2'$, is increased to become the angle $\alpha_2$, i.e. if the friction element 2 is moved, in the manner illustrated in full-drawn fashion in FIGURE 1, to the point $A_2$ where the associated angle $\alpha_2$ corresponds, in FIGURE 2, to the point $B_3$ on the curve associated with the lowest coefficient of friction, at which point the same $U/K$ value is obtained. If, with the friction element in this position, the coefficient of friction rises again to its original higher value, then the radical rise in peripheral force produced by the projection of point $B_3$ to point $B_4$ on the upper curve would take place, but this could equally be compensated for simply by returning the friction element 2 to the reaction point $A_2'$, corresponding to angle $\alpha_2'$, thus returning the system to the original state point $B_I$.

As indicated in this consideration of a situation in which the coefficient of friction drops and rises from the particular assumed maximum value to the minimum value and then back again, the only way of keeping the value $U/K$ defined by the horizontal line through points $B_1$, $B_3$, unchanged, would be to shift the friction element 2 along the periphery of the shoe, from the point $A_2$ to the point $A_2'$ and back from there to the point $A_2$. The conditions applying here to the maximum and minimum values defined by the two curves, apply similarly to any arbitrary intermediate value of the coefficient of friction falling within the range so defined.

In other words, if a simple means could be devised of effecting this peripheral shift of the friction element 2 strictly in accordance with the requirements dictated by the horizontal $B_3$, $B_1$ in association with the curve laws, and this in an inertia-free fashion, then within the prescribed range, the coefficient of friction would have no effect upon the friction-generating process. Such a means will now be explained on the basis of the example of FIGURE 3, with the sole difference that in place of the imagined physical displacement of the friction element 2, the theoretical displacement of a force vector which achieves the same effect by shifting in relation to a fixed friction element arrangement is considered, the two friction elements 2' and 2 located at the pheripheral points $A_1$ and $A_2$ respectively defining the physical dispositions against the background of which the force vector shift takes place, the friction elements being arranged on a shoe member which is in the form of a rocker 6. The point of support (reaction point) $A_2$ of the rocker is located at the same angle $\alpha_2$ to the perpendicular, as the friction element 2 on the shoe member 3 of FIGURE 1, and can, in accordance with point $B_3$ on the curve of FIGURE 2, maintain the full $U/K$ value even where the coefficient of friction has dropped to the lowest of the values considered. The point $A_2$ thus constitutes a point of maximum friction. The other reaction point $A_1$, however, is disposed on the perpendicular itself, where the angle $\alpha=0$, and in accordance with the upper curve in FIGURE 2 this means that we are working at the lowest point M where, with the highest of the coefficients of friction in question, the value $U/K$ is smallest. Thus, the peripheral point $A_1$ of FIGURE 3 represents the location of least friction.

The rocker 6, acting as a shoe member which engages the drum member on the one hand at the location $A_2$ of maximum friction and on the other hand at the location $A_1$ of least friction, is supported in a hollow 8 formed in the shoe lever 5 through the medium of a knife-edge fulcrum arrangement, and can pivot slightly, the shoe lever 5 in turn being pivotable (in the same way that the shoe member 3 of FIGURE 1 is pivotable about its fulcrum pin 4) about the fulcrum and reaction point 9 which is also in the form of a knife-edge. Just as the point of frictional contact $A_2$ on the cylindrical internal periphery of the drum member 1 in FIGURE 3 corresponds with the similar point of contact $A_2$ in FIGURE 1, so there is a corresponding relationship between the fulcrum and reaction points 9. Again, in the same way that in FIGURE 1 the line of action of reaction force P through point $A_2$ makes the friction angle $s$ with the radius and makes a tangent with the circle of radius $r. \sin s_{0.15}$ described about the point 0, this circle corresponding to the smallest coefficient of friction considered, parallel conditions apply to the point $A_2$ in FIGURE 3 where the maximum friction effect obtains. For the rest, the common reaction force P relating to the two points $A_2$ of FIGURES 1 and 3, is the largest force to occur at any point in our consideration of the overall friction-generating process.

If, in accordance with FIGURE 3, the fulcrum 7 of the rocker 6 is placed upon the line of action $A_2S_{0.15}$, then the force relationships of FIGURES 1 and 3 agree with one another, so that when the contact force K is applied to the shoe lever 5 of FIGURE 3, and if the moment arm determined by the horizontal distance between the point of application of this force and the fulcrum or reaction point 9 is the same as in FIGURE 1, the same $U/K$ value is obtained as that corresponding to the point $B_3$ on the curve of FIGURE 2. It is only in this extreme case, corresponding to the lowest coefficient of friction considered here, that the rocker friction element 2 located at point $A_2$ in FIGURE 3 is responsible for the complete friction developed, like the single element in FIGURE 1, the other rocker friction element 2', located at point $A_1$ in FIGURE 3, making no contribution at all. This one-sided condition continues if, considering FIGURE 3, the fulcrum 7 of the rocker is moved along the line of action $A_2S_{0.15}$, but changes to a condition in which the friction element 2' of the rocker 6, located at point $A_1$, this corresponding to the normal state, makes a contribution, as soon as the minimum coefficient of friction is exceeded to the slightest extent.

In illustrating the way in which the rocker 6, with its friction elements 2', 2 located at the points $A_1$ and $A_2$, operates, we can commence from the fact that in relation to one and the same metallic mating surface, the friction elements 2', 2, which are made of the same material, will have the same behavior as far as the coefficient of friction is concerned so that both at point $A_1$ and at $A_2$ we shall be dealing with the same friction angle $s$ which the lines of action of the reaction forces $P_1$ and $P_2$ make with the radial lines of action $A_1 0$ and $A_2 0$ respectively of the normal force, and which must consequently intersect one another (in accordance with a geometrical theorem) at a point situated on a circle drawn through the three points $A_1$, $A_2$ and $0$. If, to accord with the friction angle $s$ corresponding to the highest value of the coefficient of friction, a tangent from the point $A_1$ to the circle of radius $r$. $\sin s_{0.45}$ struck from the centre $0$ is drawn, then the intersection point $S_{0.45}$ is obtained just as it would be if the tangent were to be drawn from the point $A_2$. This intersection point $S_{0.45}$ of the lines of action of the reaction forces $P_1$ and $P_2$ through the points $A_1$ and $A_2$, which is obtained in a similar way for any arbitrary intermediate values down to the minimum value of the coefficient of friction, this particular latter point being the point $S_{0.15}$, is in all cases the beginning point of the rocker resultant $P_{res}$ which is compounded of the two individual components $P_1$ and $P_2$ associated with the two friction elements, the line of action of said resultant $P_{res}$ having necessarily to pass through the rocker fulcrum 7 in all cases in order to satisfy the equilibrium condition.

If the lines of action of the resultant $P_{res}$ are drawn from the points $S_{0.15}$ and $S_{0.45}$, and also from intermediate points, then it will be seen that the initial line of action corresponding to the lowest coefficient of friction, passing through $A_2$ and corresponding to the condition in which the friction element at this point is the only one effective, swings steadily further in the clockwise sense around the rocker fulcrum 7 as the coefficient of friction rises, (i.e. as the intersection points between $S_{0.15}$ and $S_{0.45}$ move from right to left), swinging in fact more toward the side of the least effective friction point $A_1$, the higher the coefficient of friction at said two points $A_1$ and $A_2$, is. Thus, it is solely the coefficient of friction which, simply by virtue of the size of the associated friction angle, affects the vectorial relationship, and entirely on its own automatically brings about vector shift by changing the directions of the line of action, this in principle independently of the magnitude of the forces acting along these lines.

The lines of action rotating about the rocker fulcrum point 7, i.e. the lines of action of the resultant $P_{res}$ of the reaction components $P_1$ and $P_2$ passing through the points $S_{0.15}$ to $S_{0.45}$, intersect the internal periphery of the drum member 1 at the points $A_2$ to $A_{0.45}$. These points in each case indicate the position at which an imaginary individual friction element 2 would have to be located if, forced into contact with the force corresponding to the resultant $P_{res}$ as determined by the particular coefficient of friction, it alone were to produce the same $U/K$ value as the two friction elements 2 (acting at points $A_1$ and $A_2$) together, so that $U/K = (U_1 + U_2)/K$ obtains even though the associated "resulting" friction angle which the resultant $P_{res}$ associated with points $A_2$ to $A_{0.45}$, makes, is not the same numerically (once the point $A_2$ is left behind) as the angle occurring at $A_1$ and $A_2$ in accordance with the particular coefficient of friction prevailing at the two friction elements 2; although with the coefficient of friction not being involved anyway, these numerical values are immaterial.

In other words, by vector displacement it is possible in the final analysis to achieve fundamentally the same effect as that achieved in the example of FIGURE 1 by the physical displacement of a single friction element 2 along the periphery between $A_2$ and $A_2'$ where, if the displacement law determined by the horizontal through the two points $B_3$ and $B_1$ of FIGURE 2 is strictly followed, the coefficient of friction has no influence at all.

In FIGURE 1, the conditions are so selected that at the point $A_2'$ where the individual friction element 2 is located and which subtends the central angle $\alpha_2'$, the line of action P', being a reaction force, is vertically disposed for the highest coefficient of friction under consideration, and is thus parallel to the line of action of the contact force K. This means that the horizontal component H at the fulcrum and reaction point 9 of the shoe member 3 is zero, so that exclusively a vertical reaction component V has to be provided here. Use is made of this effect in the arrangement of FIGURE 3, where the rocker fulcrum point 7 which initially can be anywhere on the straight line $A_2 S_{0.15}$, is so disposed that the straight line passing through it from $S_{0.45}$ to $A_{0.45}$ is vertical. Since the resultants $P_{res}$ can only rotate towards the left in relation to this vertical, this means that at all times the horizontal component H of the support reaction at the fulcrum and reaction point 9 of the shoe lever 5 will be towards the left, and consequently since there is no change in the direction of the force, the rocker design enables the fulcrum and the reaction point 9 of the shoe lever 5 to be made in the form of a simple knife-edge.

In the internal shoe arrangement of FIGURE 4, we are dealing with basically the same design and arrangement, with a rocker control device 6 located through the medium of a knife-edge in a hollow 8 formed in the shoe member 5, this rocker device again having two friction elements 2', 2 and incorporating further features. For instance, the force components H and V acting at the fulcrum and reaction point 9 are no longer resisted by an externally originating fixed support or reaction point, for instance on the lines of the pin 4 in FIGURE 1, but by the internal shoe arrangement itself, and are used to produce additional friction forces, and to this end the fulcrum and reaction point 9 of the rocker shoe 5 (in which, as before, the reaction component of the force H need merely be resisted in the right-hand sense, due to the avoidance of a change in direction of the force) is carried on a knife-edge 13 in a bearing block 12 which can be slid backwards and forwards for purposes of adjustment, the toothed (14) underside of which block is carried on a platform 11 which extends across from another shoe member 10 located in a different plane. This other shoe member 10, also carrying a friction element 2'' at the point of contact $A_H$, is intended to provide friction-derived support to the right-hand-directed reaction component H stemming from the "fan" of resultants $P_{res}$ and decreasing to zero at the resultant rocker reaction point $A_{0.45}$, this reaction component H being transmitted as a compression force to the reaction point $A_H$ through the toothing 14, which locks in the direction.

The shoe member 10, forced into engagement by the horizontal contact force H, can have its friction effect controlled for example by displacing the friction element 2'' to one or other of the further bearing grooves 29 which are provided, and which correspond to different angles $\alpha_H$, and supports the resultant peripheral force $U_H$ (the shoe member 10 is freely supported at both its ends) at its right-hand end by virtue of the vertical reaction force $R_H$ acting at the point 30 and supplied by the top face of the fixed supporting block 20 located there. The corresponding vertical component at the left-hand side of the shoe member 10, to which there is added a vertical component produced by the rocker 6 at the fulcrum and reaction point 9 of the shoe member 5 to form a total vertical component V, is provided through the cylindrically arched portion 15 on the underside of the platform 11 of the shoe member 10, which portion 15 co-operates with a slot formed in the head of a nut 16. Through the medium of this nut 16, which is associated with a second similar nut via the adjusting spindle which is accessible from the outside through the finger nut 17, the total vertical force V produced by the upper system composed of the two shoe members 5 and 10 is transmitted to the similarly cylindrically arched left-hand portion 17 of a third shoe member 19, where it acts as the contact force, this shoe member carrying the main burden in the friction-generating process and being additionally stiffened by the provision of ribs 18. This main shoe member 19, which, like the shoe member 10, is also freely supported and forced into contact in a vertical manner, has its other point of support at the point 32 on the support block 20, where the vertical reaction force R acts. This shoe member is provided with two shoe members $2^{III}$, $2^{IV}$ located at the points $A_I$ and $A_{II}$, the said points being so selected that for an assumed mean value of the coefficient of friction, this has been drawn in to scale in the force diagram using a tangent circle of radius $r$. $\sin_{037}$, these two members are each responsible for half the total friction effect produced, i.e. that the peripheral forces $U_I$ and $U_{II}$ (produced in accordance with the contact force K applied to the rocker shoe member 5), along with their normal forces $N_I$, $N_{II}$ and their resultants $P_I$, $P_{II}$, are equal.

The way in which the individual forces are dispositioned can be so selected that even in arrangements in which there is an extremely marked inherent servo effect, where a change in coefficient of friction of such order as to result in an inadmissibly large multiplication in the $U/K$ value can be produced, the coefficient of friction is largely without influence upon the result.

Figure 5:
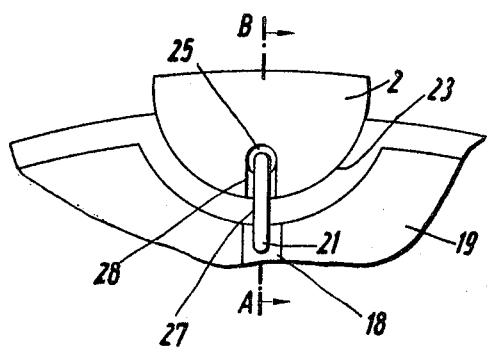
FIGURE 5 is a plan view, looking in the direction of the axis of rotation, of an arrangement for anchoring the friction elements.
Figure 6:
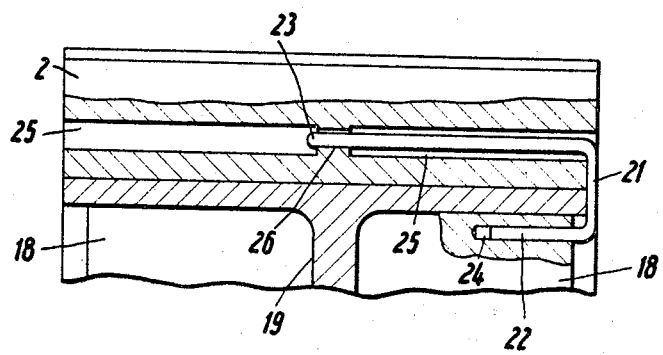
FIGURE 6 is a perpendicular section through FIGURE 5.

The constructional detail, illustrated in FIGURES 5 and 6, of a simple robust device for fixing the friction element $2^x$ in its bearing groove 29 on the periphery of the shoe member, this without interfering with its facility for freedom of adjustment, consists of a spring clamp 21 inserted at the side of the shoe member. This clamp is in the form of a U-shaped piece of steel wire, in which the legs of the U are not equal in length, the shorter leg 22 being fixed in a drilling 24 formed in the side of the shoe beneath the bearing groove 29 and in the central plane thereof, and the longer leg 23 being inserted into a drilling 26 formed in the friction element $2^x$ in the lower part thereof and running parallel to its axis. The drilling 26 is enlarged at either side of the element to form a larger diameter bore 25.

At one of the end faces, a groove 27 is provided at the edge of the bearing groove 29, to trap the vertically disposed part of the clamp 21, and in the friction element $2^x$ there is formed a somewhat broader groove 28 to provide adequate facility for pivoting about the axis of the groove 29, it being additionally possible if desired to provide some kind of locking arrangement to prevent undesired axial displacement. The release and attachment of the clamp from the side-face, simply by pulling it out or pushing it in, means that the friction elements 2 can be easily exchanged even where the related shoe members are in the assembled state.

I claim:

1. A friction device including a drum member revolving about a center, a rocker member having at least two arms of mutually different length, at least one friction element carried by each of said arms and eccentric actuating means to move said rocker member such that said friction elements are urged into contact with said drum member said arms, elements and actuating means forming means for operating the device for the same actuating force independently of the coefficient of friction between said friction elements and said drum member.

2. A friction device as claimed in claim 1 wherein said means comprises an operating lever (5) which is pivotably mounted on a support (9), said rocker member (6) being mounted to rock about a fulcrum (7) on said operating lever (5).

3. A friction device as claimed in claim 2 wherein said fulcrum (7) is in the form of a knife-edge.

4. A friction device as claimed in claim 3 including a further member (19), and two further friction elements ($2^{III}$, $2^{IV}$) carried by said further member (19), said further member (19) being mounted so that reaction forces produced at said support (9) urge said further friction elements ($2^{III}$, $2^{IV}$) into contact with said drum member (1).

5. A friction device as claimed in claim 1 which is a friction brake.

6. A friction device, as claimed in claim 2, and auxiliary shoe members disposed within the interior of said drum member, said support being in force transmission connection with said auxiliary shoe members.

7. A friction device comprising in combination, an annular drum member, friction generating means engaging said drum member and including friction elements positioned in statically predetermined position along a relatively small portion of the circumference of said drum, and actuating means operable for applying force to activate said friction generating means relative to said drum member, said friction generating means being so arranged relative to said drum member that the vector of resulting forces of said friction elements in action, within a predetermined friction elements constellation, will change positions automatically and will for the same actuating force be independent of the friction coefficient between said elements and said drum, said predetermined friction elements constellation including said elements engaging said drum in such a position as to encompass a range of a small and a large friction generating effect, respectively.

References Cited

UNITED STATES PATENTS

| | | | |
|---|---|---|---|
| 885,447 | 4/1908 | Cross | 188—80 X |
| 1,890,031 | 12/1932 | Fitts | 188—78 |
| 2,041,935 | 5/1936 | Kliewer | 188—78 |
| 2,942,694 | 6/1960 | Burnett | 188—70 |

FOREIGN PATENTS

| | | |
|---|---|---|
| 299,136 | 4/1900 | France. |
| 737,934 | 10/1955 | Great Britain. |

MILTON BUCHLER, *Primary Examiner.*

THOMAS W. BUCKMAN, *Assistant Examiner.*

U.S. Cl. X.R.

188—236